United States Patent
Mann et al.

(10) Patent No.: US 8,844,573 B2
(45) Date of Patent: Sep. 30, 2014

(54) VALVE ARRANGEMENT FOR CONTROLLING BRAKE DEVICES AND AUXILIARY DEVICES OF A PNEUMATIC BRAKE SYSTEM OF A VEHICLE

(75) Inventors: Hartmut Mann, Bergkirchen (DE); Steffen Krasselt, München (DE); Jörg-Johannes Wach, München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 319 days.

(21) Appl. No.: 13/120,239

(22) PCT Filed: Sep. 23, 2009

(86) PCT No.: PCT/EP2009/006861
§ 371 (c)(1),
(2), (4) Date: Apr. 29, 2011

(87) PCT Pub. No.: WO2010/034476
PCT Pub. Date: Apr. 1, 2010

(65) Prior Publication Data
US 2011/0209787 A1   Sep. 1, 2011

(30) Foreign Application Priority Data
Sep. 23, 2008 (DE) .......................... 10 2008 048 562

(51) Int. Cl.
*F16K 27/00* (2006.01)
*B60T 8/36* (2006.01)
*B60T 13/68* (2006.01)
*B60T 17/04* (2006.01)

(52) U.S. Cl.
CPC ............. *B60T 13/683* (2013.01); *B60T 17/04* (2013.01)
USPC ...... 137/884; 137/454.5; 137/883; 303/119.3

(58) Field of Classification Search
USPC .................. 137/454.5, 454.6, 884; 303/119.3
See application file for complete search history.

(56) References Cited

U.S. PATENT DOCUMENTS 2,834,368 A * 5/1958 Gray .............................. 137/271
3,111,139 A * 11/1963 Beckett et al. ................ 137/884
(Continued)

FOREIGN PATENT DOCUMENTS

DE  197 15 528   11/1997
DE  199 08 617    9/2000
(Continued)

OTHER PUBLICATIONS

International Search Report for International Application No. PCT/EP2009/006861, dated Mar. 1, 2010.
(Continued)

*Primary Examiner* — Stephen M Hepperle
*Assistant Examiner* — Seth W Mackay-Smith
(74) *Attorney, Agent, or Firm* — Banes & Thornburg LLP

(57) ABSTRACT

A valve arrangement controls brake devices and auxiliary devices of a pneumatic brake system of a vehicle, and includes pneumatic control valves which are detachably arranged on at least one common support module containing compressed air channels, for carrying out braking functions or auxiliary braking functions of the brake system. The valve arrangement also includes several adjacently arranged block-shaped support modules having at least the same height and depth measurements and including channel sections forming common longitudinal channels when all of the support modules are adjacently arranged in a row. At least one unit hole receives a control valve embodied as a cartridge valve and arranged on a front side of each support module to enable switching the compressed air flow between inner channels.

4 Claims, 1 Drawing Sheet

(56) References Cited

U.S. PATENT DOCUMENTS

| | | | |
|---|---|---|---|
| 3,244,193 A * | 4/1966 | Loveless | 137/454.6 |
| 3,504,704 A * | 4/1970 | Beckett et al. | 137/625.64 |
| 3,589,387 A * | 6/1971 | Raymond | 137/261 |
| 4,230,143 A * | 10/1980 | Dettmann et al. | 137/270 |
| 4,312,425 A * | 1/1982 | Snow et al. | 184/7.4 |
| 4,399,836 A * | 8/1983 | de Versterre et al. | 137/487.5 |
| 5,988,766 A | 11/1999 | McCurdy, Jr. | |
| 6,086,163 A * | 7/2000 | Klink et al. | 303/7 |
| 6,135,574 A * | 10/2000 | Pettit et al. | 303/15 |
| 6,142,185 A * | 11/2000 | Meyer | 137/884 |
| 6,234,201 B1 * | 5/2001 | Strobel | 137/596 |
| 6,302,149 B1 * | 10/2001 | Sato et al. | 137/884 |
| 6,990,999 B2 * | 1/2006 | Patel | 137/625.64 |
| 7,849,880 B2 | 12/2010 | Herges | |
| 2005/0231026 A1 * | 10/2005 | Barberis et al. | 303/7 |
| 2007/0131294 A1 * | 6/2007 | Zub | 137/884 |
| 2007/0215209 A1 * | 9/2007 | Street et al. | 137/263 |

FOREIGN PATENT DOCUMENTS

| | | | | |
|---|---|---|---|---|
| DE | 19908617 A1 * | 9/2000 | | B60T 17/00 |
| EP | 0 909 898 | 4/1999 | | |
| EP | 1 031 730 | 8/2000 | | |
| EP | 1 400 702 | 3/2004 | | |
| GB | 2125903 A * | 3/1984 | | F15B 21/00 |
| JP | 51-024920 | 2/1976 | | |
| JP | 6-238388 A | 8/1994 | | |
| JP | 8-85428 A | 4/1996 | | |
| JP | 11-170995 | 6/1999 | | |
| JP | 11-278231 | 10/1999 | | |
| JP | 2001-32956 A | 2/2001 | | |
| JP | 2002-274349 | 9/2002 | | |
| WO | 2006/045489 | 3/2006 | | |

OTHER PUBLICATIONS

Transmittal of International Preliminary Report on Patentability for International Application No. PCT/EP2009/006861 and Written Opinion, Apr. 2011.

English Translation of the International Preliminary Report on Patentability for International Application No. No. PCT/EP2009/006861 and Written Opinion, Apr. 2011.

* cited by examiner

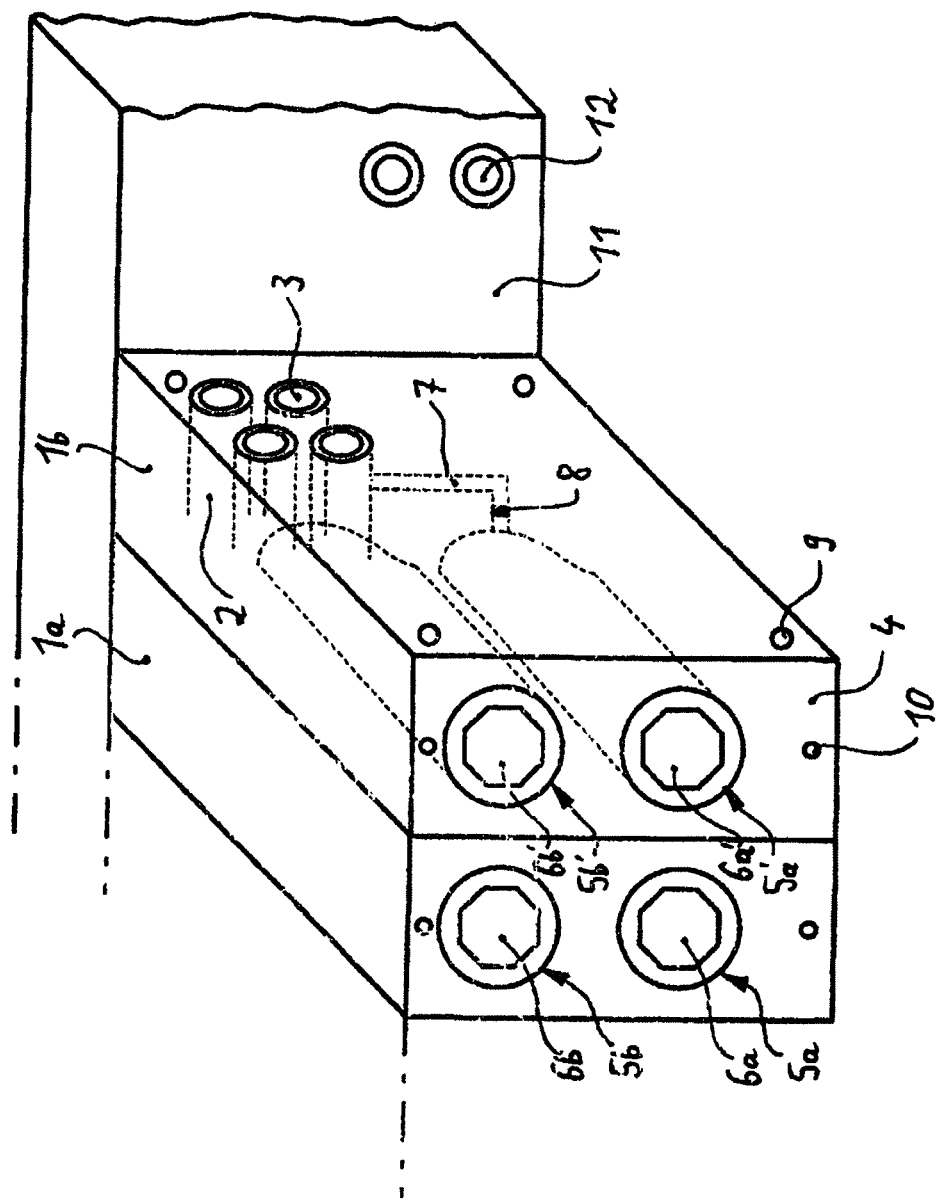

VALVE ARRANGEMENT FOR CONTROLLING BRAKE DEVICES AND AUXILIARY DEVICES OF A PNEUMATIC BRAKE SYSTEM OF A VEHICLE

The present application claims the benefit of priority to International Patent Application No. PCT/EP2009/006861 filed 23 Sep. 2009, which further claims the benefit of International Patent Application No. 10 2008 048 562.4 filed 23 Sep. 2008, the contents of which are incorporated herein by reference in their entirety.

FIELD OF INVENTION

Disclosed embodiments relate to a valve arrangement for controlling brake devices and auxiliary devices of a pneumatic brake system of a vehicle, the arrangement includes pneumatic control valves which are detachably mounted on at least one common support module containing compressed air ducts, for performing braking functions or auxiliary braking functions of the brake system.

BACKGROUND

DE 1 905 561 U1 sets forth a valve arrangement of the generic type for controlling brake devices and auxiliary devices. A brake system for rail vehicles is disclosed, comprising a brake control valve, which is flange-mounted on a support module and controlled by the pressure in the main air line, and which is connected to an auxiliary brake reservoir and a brake cylinder. From the main air line a further secondary line leads to a further support module, which is connected by further piping to a pipe connection in the first aforementioned support module constantly subjected to the pressure in the auxiliary brake reservoir, and to a filling line. All auxiliary devices of the compressed air brake, in this case a monitoring device with stopcock, pressure-reducing valve and non-return valve for filling the auxiliary brake reservoir from the filling line, an electrical brake control device and the brake booster are flange-mounted on the further support module. The support module contains air ducts, which integrate the auxiliary devices, flange-mounted on the support module and arranged in conventional circuits, into the compressed air brake. The arrangement of the auxiliary devices on the support module allows them to be integrated, with only minor alterations, into an existing compressed air brake comprising the main air line, the first support module, the brake control valve, the auxiliary brake reservoir, the brake cylinder and corresponding connecting lines.

SUMMARY

One disadvantage of this technical solution from the production engineering standpoint is that the support modules to be provided with internal ducts are elaborate to produce on boring and milling machines. Replacing pneumatic control valves and the like flange-mounted onto the support module requires the intricate release of multiple screwed connections; after dismantling, a flat gasket that is generally provided usually has to be renewed. Each support module has to be designed to customer requirements according to the configuration of the control valves flange-mounted thereon. This leads to a large number of different types of support modules.

Disclosed embodiments improve a valve arrangement for controlling brake devices and auxiliary devices of a pneumatic brake system in such a way that the individual pneumatic control valves combine with universally useable support modules, making them easy to replace.

BRIEF DESCRIPTION OF THE FIGURE

The FIGURE shows a perspective, schematic view of a valve arrangement comprising multiple support modules.

DETAILED DESCRIPTION

Utility is provided in the sphere of rail vehicle construction, for example, where pneumatic brake systems are used, which may comprise normal brake, such as brake cylinders, as well as auxiliary devices, such as parking brakes, air suspensions, sanding equipment and the like. Pneumatic control valves are mainly used to coordinate the control of such devices with those brake devices in accordance with an overall control.

Disclosed embodiments embrace the technical teaching that multiple, concatenated, block-shaped support modules having at least the same height and depth dimensions are provided, which comprise duct portions, which through a concatenation of all support modules produce common longitudinal ducts, at least one standard bore being arranged on a front side of each support module for receiving a control valve embodied as a cartridge valve, which switches the flow of compressed air between internal ducts.

Utility is further provided in that the control valves may be specially embodied as cartridge valves that are standardized on the same external geometric dimensions, so that they are easily interchangeable. The block-shaped support modules may also be interchangeable, so that overall a high degree of modularity is achieved. The standard bore intended to receive the cartridge valves allows cartridge valves with widely varying valve functions to be fitted into one and the same support module. It is, thereby, possible, using only a few support modules, to achieve a maximum fitting variance and, therefore, a maximum number of functions. The identical height and depth dimensions allow an unbroken concatenation afforded by the block-shape. The width dimensions of support modules, on the other hand, may differ in a few variants, so as to provide the overall space for small and large cartridge valves over the width of the support modules. This makes it possible to cover a broad spectrum of flow rates.

The support modules of the disclosed embodiments may be connected through the common longitudinal ducts to a single control pressure shaft. This may reduce the cost of piping compared to the state of the art. Further, valves for brake devices and auxiliary devices, very compactly arranged in series in support modules of the same type can be joined to form a valve arrangement.

According to at least one disclosed embodiment, the block-shaped support modules may be designed with uniformly introduced internal ducts for ducting the compressed air in addition to the standard bores. This means that the ducting of the support modules may always identical or differs in only a few variants. Here, a profile for adaptation to desired braking and auxiliary braking functions can be obtained by way of plug elements according to the chosen purpose of the control valves, which plug elements can be inserted into the internal ducts as stopper elements, separating elements and the like. The plug elements may readily allow support modules having the same ducting to be configured differently.

The support module with control valves in the form of multi-way switch valves, such as 3/2-way directional control valves or 3/3-way directional control valves or also non-return valves may be used primarily to perform braking functions. Besides the valve types specified above, pressure switches or pressure-reducing valves, for example as part of a filter module, are also used for performing auxiliary braking functions.

In accordance with at least one disclosed embodiment, the support module may be composed of light metal, for example, a light-metal casting, into which the internal ducts may be introduced by boring. It is also possible, however, to produce the ducts, at least partially, through the method of casting. Besides these variants, it is also feasible to produce the support module from special plastics by injection molding, although these plastics need to satisfy the requirements and standards of rail vehicle construction.

In accordance with at least one embodiment, concatenated support modules may be fixed to one another by multiple longitudinal ties. This may enable the support modules to be easily dismantled after removing the ties.

Further, in accordance with at least one embodiment, fastening screws running transversely to the ties can be used for detachably fastening each of the concatenated support modules to a common support plate by their opposite side to the front side. The support plate may have a rear connection to the brake devices and auxiliary devices by way of further connecting pipes on the working line side. In addition, it is also feasible, however, to equip the support plate with a central main reservoir connection for the common supply of compressed air to all support modules, e.g., one of their longitudinal ducts.

Further measures serving to enhance the invention are outlined in more detail below together with the description making reference to the single FIGURE. The FIGURE shows a perspective, schematic view of a valve arrangement comprising multiple support modules.

As illustrated in the FIGURE, the valve arrangement may comprise two support modules 1a and 1b, for example, which may be discernibly provided with identical height and depth dimensions and may also be the same width. The support modules 1a and 1b may have duct portions 2, which, through, concatenation form common longitudinal ducts 3. The internal ducts (layer lines schematic) may be connected to standard bores 5a and 5b made on a front side 4 of each support module 1a and 1b. The two standard bores 5a and 5b may serve to receive control valves 6a and 6b embodied as cartridge valves, in order to switch the compressed air flow between the internal compressed air ducts 7.

The two support modules 1a and 1b may have uniformly introduced internal ducts, whereas the control valves 6a, 6b may be different. A plug element 8 may allow the ducting to be matched to the valve function.

Whilst the support module 1a may be equipped with control valves 6a, 6b in the form of multi-way switch valves, the other support module 1b in the illustrated embodiment may be equipped with control valves 6a', 6b' in the form of pressure switches.

The concatenated support modules 1a and 1b may be fixed to one another by multiple longitudinal ties 9. Fastening screws 10, which may be screwed in from the front side 4 of the support modules 1a and 1b, on the other hand serve for fixing to an opposing support plate 11. The support plate 11 in addition may have a central air connection 12 for the common compressed air supply to all support modules 1a, 1b, which may be provided as far in the contact area as the support plate 11 with correspondingly sealed apertures.

LIST OF REFERENCE NUMERALS 1 support module
2 duct portion
3 longitudinal duct
4 front side
5 standard bore
6 control valve
7 compressed air duct
8 plug element
9 tie
10 fastening screw
11 support plate
12 air connection

The invention claimed is:

1. A valve arrangement configured to control brake devices and auxiliary devices of a pneumatic brake system of a vehicle, the arrangement comprising:
   pneumatic control valves configured to perform braking functions or auxiliary braking functions of the brake system; and
   a plurality of concatenated, block-shaped support modules having identical height and depth dimensions, which comprise compressed air duct portions,
   wherein the pneumatic control valves are each detachably mounted on at least one common support module of the plurality of block-shaped support modules,
   wherein, concatenation of the plurality of block-shaped support modules produces common longitudinal, internal ducts,
   wherein at least one standard bore is arranged on a front side of each of the plurality of block-shaped support modules to receive a control valve, which is a cartridge valve and, which switches flow of compressed air between the longitudinal, internal ducts within the plurality of block-shaped support modules,
   wherein the valve arrangement further comprises a support plate that includes a central air connection that provides common supply of compressed air to all of the plurality of support modules,
   wherein each support module of the plurality of block-shaped support modules is equipped with control valves, and
   wherein the block-shaped support modules include uniformly introduced internal ducts to duct the compressed air, a profile of which being configured by way of plug elements for adaptation to desired braking and auxiliary braking functions according to a chosen fitting with control valves,
   wherein the control valves in the form of multi-way switch valves or non-return valves perform a braking function, and
   wherein the control valves are also in the form of pressure switches or pressure-reducing valves that perform an auxiliary braking function.

2. The valve arrangement of claim 1, wherein each support module of the plurality of block-shaped support modules is composed of light-metal casting, the internal ducts produced by boring.

3. The valve arrangement of claim 1, wherein each support module of the plurality of block-shaped support modules is fixed to another by multiple longitudinal ties.

4. The valve arrangement of claim 1, further comprising transversely running fastening screws are used for detachably fastening each of the plurality of block-shaped support modules to a common support plate by a side opposite a front side.

* * * * *